(12) United States Patent
Zhao et al.

(10) Patent No.: US 10,552,274 B1
(45) Date of Patent: Feb. 4, 2020

(54) ASYNCHRONOUS IN-MEMORY DATA CHECKPOINTING FOR DISTRIBUTED COMPUTING SYSTEMS

(71) Applicant: EMC IP Holding Company LLC, Hopkinton, MA (US)

(72) Inventors: Junping Zhao, Beijing (CN); Kevin Xu, Warren, NJ (US)

(73) Assignee: EMC IP Holding Company LLC, Hopkinton, MA (US)

( * ) Notice: Subject to any disclaimer, the term of this patent is extended or adjusted under 35 U.S.C. 154(b) by 242 days.

(21) Appl. No.: 15/668,411

(22) Filed: Aug. 3, 2017

(51) Int. Cl.
*G06F 11/00* (2006.01)
*G06F 11/20* (2006.01)
*G06F 11/14* (2006.01)
*H04L 29/08* (2006.01)
*G06F 16/11* (2019.01)

(52) U.S. Cl.
CPC ...... *G06F 11/2074* (2013.01); *G06F 11/1407* (2013.01); *G06F 11/1464* (2013.01); *G06F 11/2082* (2013.01); *H04L 67/1095* (2013.01); *G06F 11/1451* (2013.01); *G06F 11/1469* (2013.01); *G06F 16/128* (2019.01)

(58) Field of Classification Search
CPC ............ G06F 11/1407; G06F 11/2074; G06F 11/2071; G06F 11/2069
See application file for complete search history.

(56) References Cited

U.S. PATENT DOCUMENTS

| | | | | |
|---|---|---|---|---|
| 8,082,468 B1 * | 12/2011 | Backensto | .......... | G06F 11/1438 714/15 |
| 8,195,722 B1 * | 6/2012 | Havemose | .......... | G06F 11/1407 707/821 |
| 8,745,442 B1 * | 6/2014 | Havemose | .......... | G06F 11/1438 714/15 |
| 8,949,801 B2 * | 2/2015 | Andrade | ............. | G06F 11/1438 714/1 |

(Continued)

OTHER PUBLICATIONS

F. Zhao et al., "Improved Reliable Streaming Processing: Apache Storm as Example," 2016 Hadoop Summit, Sep. 1, 2016, 34 pages, Melbourne, Australia.

(Continued)

*Primary Examiner* — Marc Duncan
*Assistant Examiner* — Jonathan D Gibson
(74) *Attorney, Agent, or Firm* — Ryan, Mason & Lewis, LLP

(57) ABSTRACT

Techniques are provided for implementing asynchronous checkpointing of in-memory data in a distributed computing system. For example, a method includes processing a stream of data records by an operator executing on a computing node, maintaining in a system memory, an operator state which is generated in response to the operator processing the stream of data records, and performing an asynchronous checkpointing process. The asynchronous checkpointing process includes enqueuing a checkpoint of the operator state in a first queue, wherein the first queue is maintained in the system memory, and executing a background worker thread to dequeue the checkpoint of the operator state from (Continued)

the first queue and store the checkpoint of the operator state in a data store. The operator continues with processing the stream of data records during the asynchronous checkpointing process.

20 Claims, 7 Drawing Sheets

(56) References Cited

U.S. PATENT DOCUMENTS

| | | | |
|---|---|---|---|
| 9,244,869 B1* | 1/2016 | Bent | G06F 13/1673 |
| 9,471,438 B1* | 10/2016 | Jacques Da Silva | |
| | | | G06F 11/1451 |
| 2016/0306714 A1* | 10/2016 | De Smet | G06F 11/1451 |
| 2017/0116089 A1* | 4/2017 | Park | G06F 11/1471 |
| 2018/0205776 A1* | 7/2018 | Shi | H04L 69/40 |

OTHER PUBLICATIONS

P. Carbone et al., "Lightweight Asynchronous Snapshots for Distributed Dataflows," arXiv prepring arXiv: 1506.08603, Jun. 29, 2015, 8 pages.

S. Venkataraman et al., "Drizzle: Fast and Adaptable Stream Processing at Scale," http:/shivaram.org/drafts/drizzle.pdf, 2016, 16 pages.

Yahoo!, "Yahoo Streaming Benchmarks," https://github.com/yahoo/streaming-benchmarks, 2017, Aug. 3, 2017, 3 pages.

Apache Apex Core Documentation, "Best Practices," https://apex.apache.org/docs/apex/development_best_practices/, Aug. 3, 2017.

* cited by examiner

100

400

ASYNCHRONOUS IN-MEMORY DATA CHECKPOINTING FOR DISTRIBUTED COMPUTING SYSTEMS

FIELD

This disclosure relates generally to techniques for managing in-memory data and, in particular, to techniques for checkpointing in-memory data in a distributed computing environment.

BACKGROUND

There are various applications in which large amounts of data generated in computing environments are pushed to one or more servers in a cluster server for real-time processing. Such applications include, for example, sensor based monitoring (e.g., network of Internet of Things sensors for industry monitoring), financial anti-fraud monitoring, stock trading, web traffic monitoring, network anomaly monitoring, machine learning (ML), deep learning (DL), big data analytics, or other high-performance computing (HPC) applications, etc. These applications generate a continuous stream of records (or events), which can be pushed to a distributed computing system (e.g., distributed stream processing system) that is configured for large scale, real time data processing and analysis of such data streams. A distributed computing system comprises a large scale of shared computing resources that are distributed over a cluster of computing nodes. Techniques for implementing an efficient distributed computing environment for data stream analytics and HPC applications is not trivial as the intensive computational workloads, and the massive volume of data that must be communicated, streamed, prefetched, checkpointed, and coordinated between the shared computing resources of the distributed computing system presents a significant challenge and practical limit on system performance and scalability.

SUMMARY

Illustrative embodiments of the invention include methods for asynchronous checkpointing of in-memory data in a distributed computing system. For example, one embodiment includes a method which comprises processing a stream of data records by an operator executing on a computing node, maintaining in a system memory, an operator state which is generated in response to the operator processing the stream of data records, and performing an asynchronous checkpointing process. The asynchronous checkpointing process comprises enqueuing a checkpoint of the operator state in a first queue, wherein the first queue is maintained in the system memory, and executing a background worker thread to dequeue the checkpoint of the operator state from the first queue and store the checkpoint of the operator state in a data store. The operator continues with processing the stream of data records during the asynchronous checkpointing process.

Other embodiments of the invention include, without limitation, computing nodes and articles of manufacture comprising processor-readable storage media which implement methods as discussed herein.

DETAILED DESCRIPTION

Illustrative embodiments of the invention will now be explained in further detail with regard to systems and methods for implementing asynchronous checkpointing of in-memory data in a distributed computing system. As discussed in further detail below, asynchronous in-memory data checkpoint techniques according to embodiments of the invention are configured for use in high-performance and scalable distributed computing systems by enabling checkpointing operations to be performed in the background in a pipelined and parallel manner which minimizes the impact that checkpointing can have on real-time processing operations of computing nodes in a distributed computing system.

Figure 1:
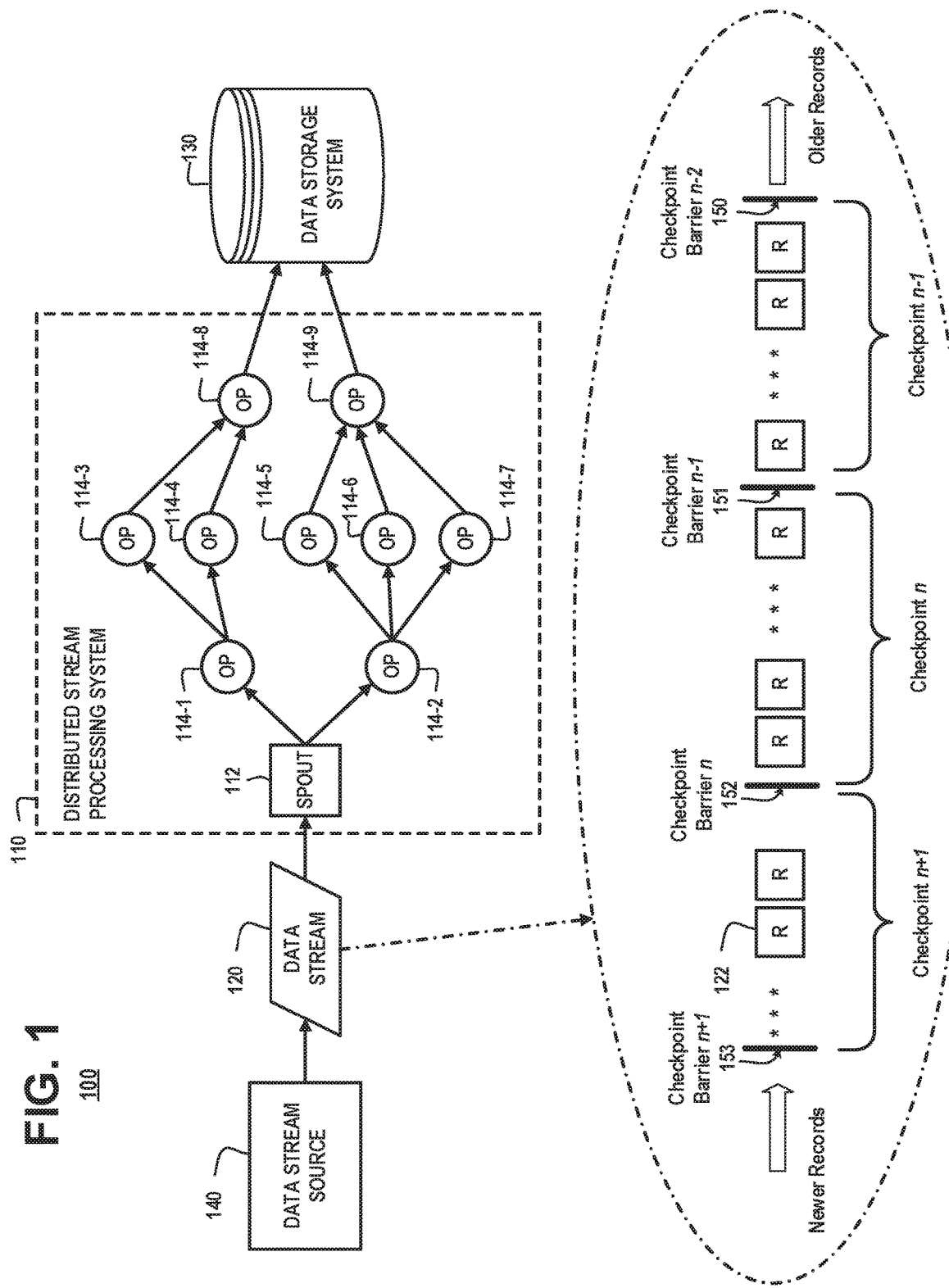
FIG. 1 schematically illustrates a distributed computing system which can be configured to implement an asynchronous in-memory data checkpoint system according to an embodiment of the invention.

FIG. 1 schematically illustrates a distributed computing system 100 which can be configured to implement an asynchronous in-memory checkpoint system according to an embodiment of the invention. The distributed computing system 100 comprises a distributed stream processing system 110 which receives and processes a continuous input data stream 120 in real time, and outputs processing results to a data storage system 130. The data stream 120 is generated and transmitted from a data stream source 140, which can be any type of computing system that generates a data stream which requires real-time processing and analysis by the distributed steam processing system 110 configured to process such data stream 120. The distributed stream processing system 110 comprises a topology of processing elements including an input node 112 (or "spout" node) and a plurality of operator nodes 114-1, 114-2, 114-3, 114-4, 114-5, 114-6, 114-7, 114-8 and 114-9 (e.g., worker nodes, bolts, etc.), collectively referred to as operator nodes 114, The processing elements 112 and 114 are logically arranged and connected in a directed acyclic graph (DAG) topology comprising a finite set of vertex nodes and directed edges (represented in FIG. 1 by arrows).

In a DAG execution model, each operator node 114 comprises a vertex node in the DAG topology, and the directed edges (arrows) represent inputs to the operator nodes 114 and outputs from the operator nodes 114. The DAG execution model specifies a topological ordering for processing the input data stream 120 by sequences of operator nodes 114 within the distributed stream processing system 110, which are connected by directed edges. Each operator node 114 comprises an input queue and an output queue. Each operator node 114 receives input from its input queue, performs some computation on the input using its local state, and generates an output result which is stored in the output queue of the operator node 114. Each operator node 114 executes independently from other operator nodes, and communication between the operator nodes 114 can be implemented using push-based or pull-based messaging schemes.

An application manager node of the distributed stream processing system 110 is configured to establish the DAG topology of spout 112 and operator nodes 114. The application manager node receives a DAG of operations which represents streaming computations, and then allocates each operation in the DAG of operations to different processing nodes (e.g., bare metal, virtual machines, and/or containers) in a server cluster. The spout 112 operates as a stream source for the DAG topology, wherein the spout 112 injects an incoming data stream 120 into the DAG topology. The spout 112 can be listening to a TCP port, pulling data from a queue, or otherwise obtaining a data stream source using other techniques, etc. The spout 112 can partition the incoming data stream 120 into sub-streams which are injected to different paths of operator nodes 114 in the DAG topology. The tasks that are executed by the spout 112 or operator nodes 114 in the DAG topology can be performed in parallel on two or more different nodes. For example, while the operator nodes 114-3 and 114-4 are shown in FIG. 1 as separate operator nodes, the operator nodes 114-3 and 114-4 may perform the same computations/operations in parallel on two different computing nodes, e.g., performing the same computations on different portions of the processing results that are partitioned and output from the upstream operator node 114-1.

The final processing results of the distributed stream processing system 110, which are generated by operator nodes 114-8 and 114-9, are stored in the data storage system 130. The data storage system 130 may comprise a Hadoop Distributed File System (HDFS), a non-relational (NoSQL) database, or any other type of data storage system which is suitable for the given application. The distributed stream processing system 110 performs real-time processing of large datasets of streamed data to enable real-time data analytics and decision making for a target application, wherein the real-time processing results are continually stored in the data storage system 130 and subsequently analyzed by a batch processing system incrementally over time to obtain deeper understanding of the data and to discover patterns in the stored data.

As shown in FIG. 1, the data stream 120 comprises a sequence of records (R) 122 that are generated continuously in time. Each record 122 comprises a data tuple comprising one or more record attributes, and a timestamp. The data stream 120 comprises a plurality of checkpoint commands that are embedded in the data stream 120 to define checkpoint barriers 150, 151, 152, and 153 that define a plurality of checkpoints (e.g., checkpoints n−1, n and n+1) of in-memory data (e.g., operator state data of stateful operators). In one embodiment, each checkpoint n−1, n and n+1 comprises a snapshot of the states of all stateful operators in the distributed stream processing system 110, which result from processing blocks of data records R 122 within the stream data stream 120 which are partitioned by the checkpoint barriers 150, 151, 152 and 153.

In one conventional scheme, a "window-based" checkpointing scheme is implemented in which a checkpoint operation is performed for every predefined period of time (e.g., every 10 seconds) or for every X number (e.g., 1000) of data records received in the incoming data stream 120. As shown in the example embodiment of FIG. 1, the checkpoint barriers 150 and 151 represent checkpoint boundaries in the data stream 120 which define a block of data records for which a checkpoint n−1 is generated since the last checkpoint (e.g., checkpoint n−2 not shown). Further, the checkpoint barriers 151 and 152 represent checkpoint boundaries in the data stream 120 which define a block of data records for which the checkpoint n is generated since the last checkpoint n−1. In addition, the checkpoint barriers 152 and 153 represent checkpoint boundaries in the data stream 120 which define a block of data records for which the checkpoint n+1 is generated since the last checkpoint n.

In distributed stream processing systems that rely on stateful computations (e.g., implementing stateful operators such as sort, join, and aggregate), each stateful operator maintains and updates its state (via an internal data structure), wherein the operator state for a given stateful operator is utilized in subsequent computations to process input data. Indeed, the state of a stateful operator is important for various reasons. For example, the state of an operator is needed for the operator processing logic to properly perform stateful computations using a current state value and current input data. In addition, maintaining the state of a stateful operator in a reliable location can help to achieve fault tolerance when fault recovery is needed in the event of failure (e.g., operator, node, or network failure) to restore the distributed computing system to a previous checkpointed state and resume computations from the previous checkpointed state. Moreover, maintaining operator state can facilitate iterative processing in certain applications such as machine learning applications.

In this regard, the ability to implement an efficient checkpoint-based reliable processing mode in a distributed stream processing system to maintain the state of stateful operators with minimal impact on system performance and scalability is a primary concern for distributed processing systems. If an operator node has in-memory data representing a current state of the operator, the operator should checkpoint the existing state to either a local file store (FS) or a HDFS (or other storage system). During checkpointing, many existing solutions would pause the data processing of new data tuples to make a barrier, but the new data tuples could be accepted and temporarily maintained in a staging buffer. To reduce the performance impact, some conventional checkpoint solutions save in-memory data states to a local FS first, and then re-save the in-memory data states to a shared data storage system (e.g., HDFS) using background processing. This process is repeated until all required operators complete the checkpointing commands, and a global checkpoint manager would then update a checkpoint state as finished. Note, different operators may run checkpointing commands in parallel for different windows of data tuples. There are various issues and challenges associated with such conventional checkpointing techniques.

For example, such conventional checkpointing techniques can adversely affect system performance due to input/output ("I/O") operations and the blocking/pausing of processing of new data records tuples during checkpointing operations. Indeed, since I/O to storage is usually slower (even with solid state drivers (SSD)) than in-memory processing, and can be unpredictable under high load pressures, the I/O operations that are implemented during a critical checkpointing routine would introduce considerable latency, even with existing ckeckpointing methods that may initially save snapshots of in-memory data states to a local FS before transferring the snapshots to a remote data storage system such as HDFS. Furthermore, temporarily suspending normal processing during checkpointing naturally adds latency in the system.

Furthermore, conventional checkpointing methods consume processor (e.g., CPU) and system resources. In particular, the conventional checkpointing method discussed above which requires two persistent storage steps that save a checkpoint image to a local FS (to reduce latency) at first, and then a copy to HDFS (to improve data reliability), usually consumes a significant amount of CPU and I/O resources. Indeed, such operations to store checkpoint states require serialization of an in-memory object to the local FS (usually Java), or to a FS page buffer or disk if memory pressured, and then reading from the local FS, serializing via a HDFS interface and traversing a network. These I/O operations for checkpointing pose a significant challenge with regard to system scalability, as there can be a significant number of operators in a DAG topology, which results in aggregation of the end-to-end latency, and the amount of resources consumed, to support checkpointing for many operations. This results in performance degradation and resource pressure.

Figure 2:
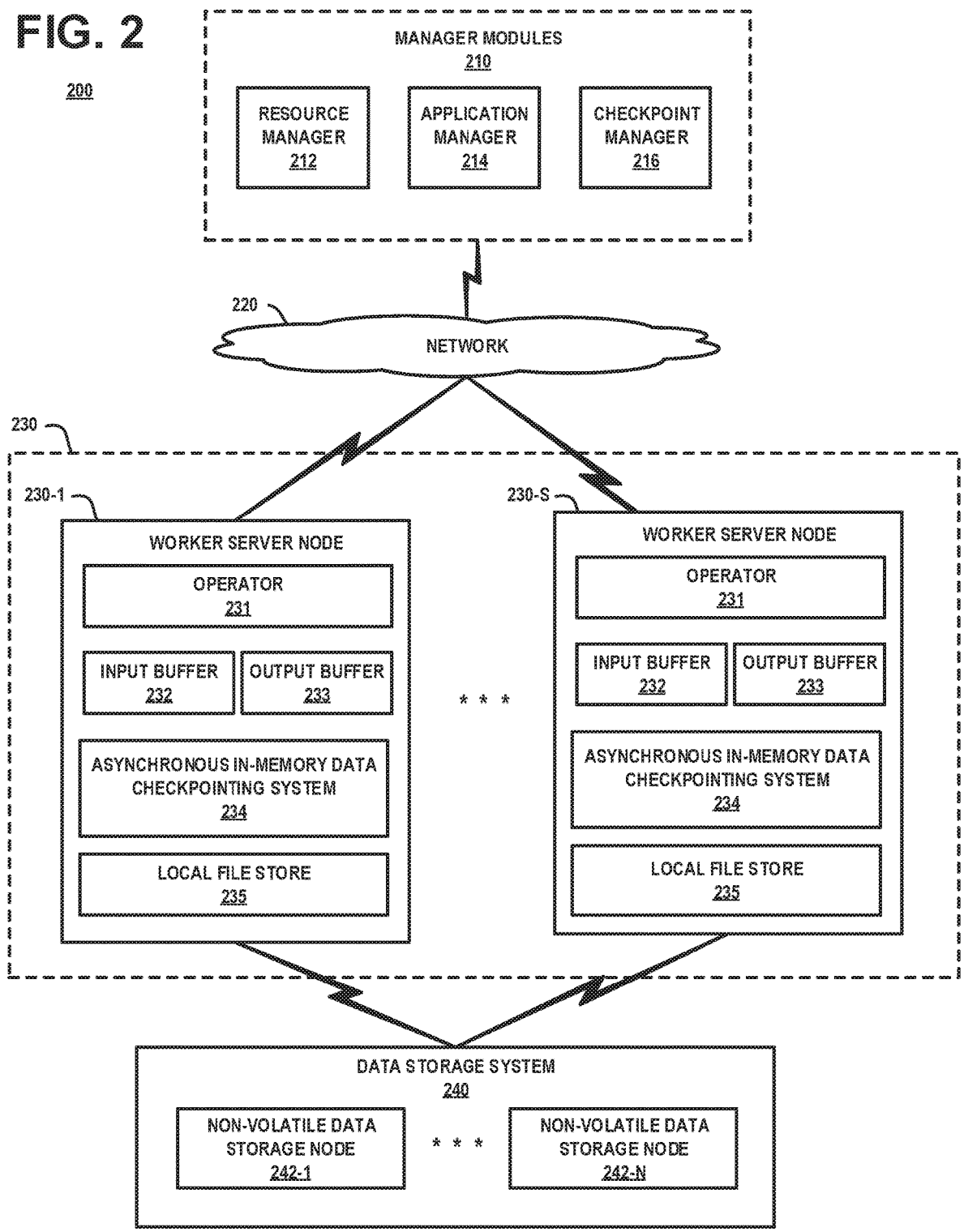
FIG. 2 is a high-level schematic illustration of a distributed computing system which implements an asynchronous in-memory data checkpoint system according to an embodiment of the invention.

FIG. 2 is a high-level schematic illustration of a distributed computing system 200 which implements an asynchronous in-memory data checkpoint system according to an embodiment of the invention. The distributed computing system 200 comprises a plurality of manager modules 210, a communications network 220, a plurality (S) of worker server nodes 230-1, . . . , 230-S (collectively referred to as worker server nodes 230), and a data storage system 240. The manager modules 210 comprise a resource manager 212, an application manager 214, and a checkpoint manager 216, which execute on the same or different computing nodes of the distributed computing system 200. The data storage system 240 comprises a plurality (N) of data storage nodes 242-1, . . . , 242-N (collectively referred to as data storage nodes 242). The worker server nodes 230 represent physical (bare-metal) server machines, or virtual machines and/or containers that execute on physical server machines.

The communications network 220 may comprise any known communication network such as a global computer network (e.g., the Internet), a wide area network (WAN), a local area network (LAN), a satellite network, a cable network, a wireless network such as Wi-Fi or WiMAX, or various portions or combinations of these and other types of networks. The term "network" as used herein is therefore intended to be broadly construed so as to encompass a wide variety of different network arrangements, including combinations of multiple networks possibly of different types. In this regard, the communications network 220 in some embodiments comprises a combination of multiple different types of communications networks each comprising network devices configured to communicate using Internet Protocol (IP) or other related communication protocols. The communications network 220 comprises intermediate points (such as routers, switches, etc.) and other elements that form a network backbone to establish communication paths and enable communication between network endpoints.

The data storage system 240 may comprise any suitable type of shared and reliable data storage system or combinations of data storage systems including, but not limited to storage area network (SAN) systems, direct attached storage (DAS) systems, Hadoop Distributed File System (HDFS), a shared folder (e.g., NFS (network file system)), a serial attached storage (SAS/SATA) system, as well as other types of data storage systems comprising clustered or distributed virtual and/or physical infrastructure. The data storage nodes 242 of the data storage system 240 comprise non-volatile storage media to provide persistent storage resources for the worker server nodes 230 (e.g., to persistently store processing results, snap-shots of in-memory data generated by checkpointing operations, etc.). The non-volatile storage media may include one or more different types of persistent storage devices such as hard disk drives (HDDs) or solid-state drives (SSDs), or other types and combinations of non-volatile memory. In one embodiment, the data storage nodes 242 are implemented using, for example, an enterprise-class storage platform comprising high performance, scalable storage arrays, which can be implemented for hyper-scale computing systems.

The worker server nodes 230 each comprise an operator 231 (e.g., stateful operator), an input buffer 232, an output buffer 233, an asynchronous in-memory data checkpointing system 234, and a local file store 235. On each worker server node 230-1, . . . , 230-S, the operator 231 comprises a logical execution element that receives input data stored in the input buffer 232, performs a computation on the input data using a current state of the operator 231, and generates processing results which are stored in the output buffer 233. The input buffer 232 of a given worker server node can receive an input data stream received from a remote data source, or otherwise receive processing results stored in the output buffer 233 of another worker server node.

Furthermore, on each worker server node 230-1, . . . , 230-S, the asynchronous in-memory data checkpointing system 234 is configured to perform checkpointing operations at the command of the operator 231 to generate checkpoints of the operator state of the operator 231 at various times during stream processing. The operator state checkpointing operations that are performed on a given worker server node are performed independently of the operator state checkpointing operations performed on other worker server nodes. As explained in further detail below, the asynchronous in-memory data checkpointing system 234 is configured to implement pure asynchronous operations based on in-memory queues (e.g., checkpoint state queues and checkpoint acknowledge queues), which eliminates latency associated with I/O operations of conventional checkpointing methods as discussed above. Instead of suspending operations and serializing and checkpointing an in-memory state of the operator 231 directly to the local file store 235 or the data storage system 240 (e.g., HDFS), an asynchronous checkpointing process according to an embodiment of the invention comprises enqueuing a checkpoint of the operator state in a first queue (e.g., checkpoint state queue) which is maintained in the system memory, and then executing a background worker thread to dequeue the checkpoint of the operator state from the first queue and store the checkpoint of the operator state in a data store (e.g., the local file store 235 or the data storage system 240), while the operator 231 continues with processing the stream of data records during the asynchronous checkpointing process.

The resource manager 212 is configured to track and arbitrate/schedule the use of all available cluster resources (e.g., resources of worker server nodes 230) in the distributed computing system 200 (e.g., data center), and to assist with managing distributed applications that are running on the worker server nodes 230. The resource manager 212 may be implemented using known resource manager platforms such as, for example, the YARN or Mesos platforms. The application manager 214 is configured to process application code for a given distributed computing application, generate and configure a topology (e.g., DAG topology) of processing elements (e.g., spouts, operators, etc.), and distribute the application code across a set of allocated worker server nodes 230 to implement the topology of processing elements (e.g., operators 231) across the set of worker server nodes 230 allocated to execute the tasks associated with the distributed computing application. In this regard, the application manager module 214 maintains information regarding the upstream/downstream relationships of instantiated operators 231 and the deployment configuration of the operators 231 across the worker server nodes 230.

The checkpoint manager 216 is configured to maintain a global structure of checkpoint metadata and track a distributed checkpoint state across the cluster of worker server nodes 230. The checkpoint manager 216 has knowledge of the cluster configuration and operator topology via communication with the resource manager 212 and the application manager 214. When a given operator 231 completes its respective checkpoint operation to store the state of the operator for a given block of data records (e.g., block of data records for checkpoint n in FIG. 1), the operator 231 will report the completed checkpoint operation to the checkpoint manager 216.

Once the checkpoint manager 216 receives notice from all other involved operators 231 with regard to completion of the asynchronous state checkpointing operations of such operators for the same block of data records (e.g., the block of data records for checkpoint n in FIG. 1), the checkpoint manager 216 will update the global structure of checkpoint metadata to indicate that the checkpoint operation for the specific window of data blocks for a given data stream is complete, in which case the checkpoint will be committed, allowing the set of operators to remove the versioned states and relevant data associated with the committed checkpoint from the in-memory queues. The implementation of an independent asynchronous in-memory data checkpointing system 234 on each worker server node 230, in conjunction with the global functionality of the checkpoint manager 216 allows checkpointing operations to be implemented in an arbitrary DAG topology including fan-in/out (join operator etc.).

Figure 3:
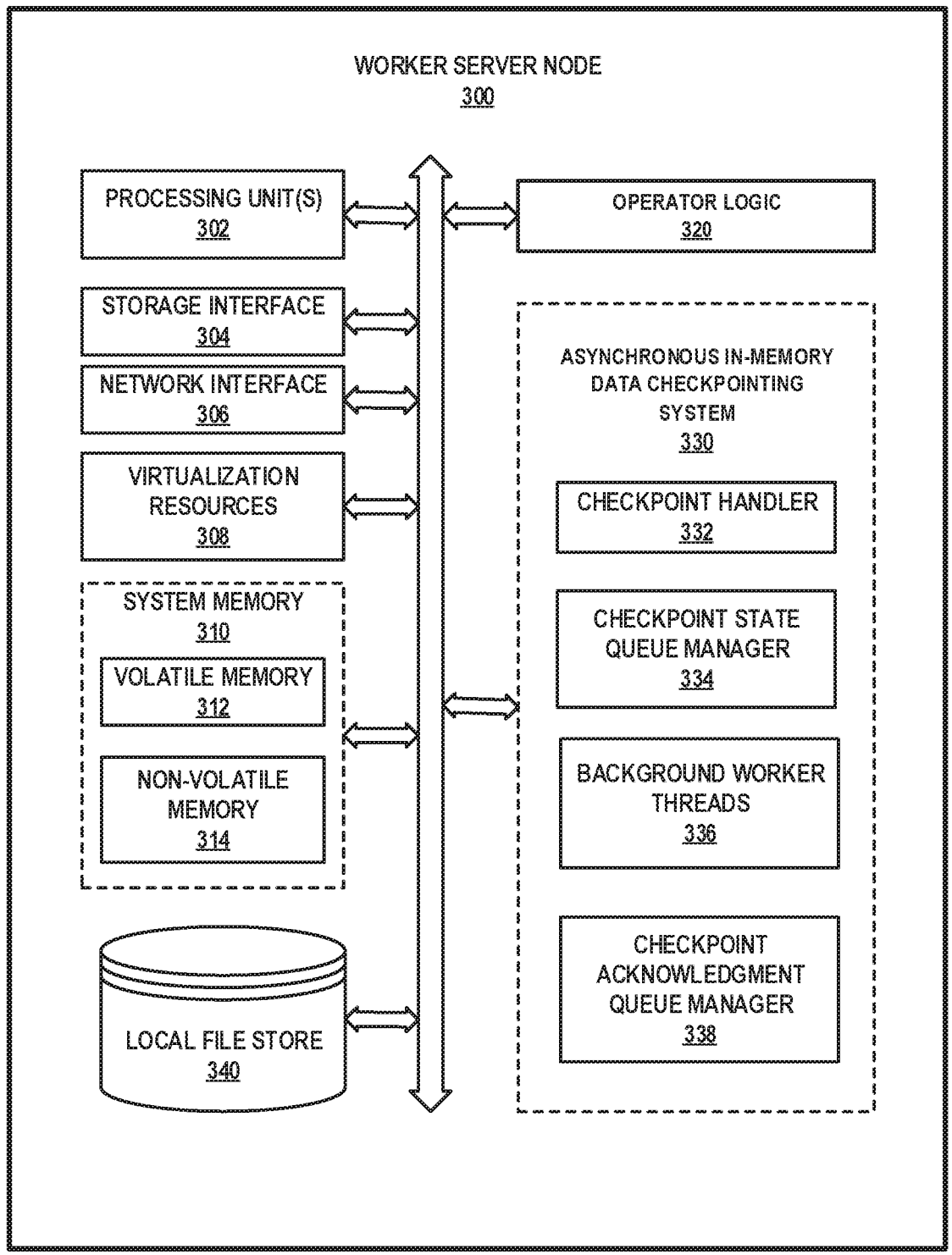
FIG. 3 schematically illustrates an embodiment of a worker server node which implements an asynchronous in-memory data checkpoint system, according to an embodiment of the invention.

FIG. 3 schematically illustrates an embodiment of a worker server node 300 which can be implemented in the distributed computing system 200 of FIG. 2, according to an embodiment of the invention. The worker server node 300 comprises one or more processing units 302, storage interface circuitry 304, network interface circuitry 306, virtualization resources 308, system memory 310, operator logic 320, an asynchronous in-memory data checkpointing system 330, and a reliable local file store 340. The system memory 310 comprises volatile memory 312 and non-volatile memory 314. The asynchronous in-memory data checkpointing system 330, comprises a checkpoint handler 332, a checkpoint state queue manager 334, background worker threads 336, and a checkpoint acknowledgement queue manager 338. The modules 332, 334, 336, and 338 of the asynchronous in-memory data checkpointing system 330 implement methods which will be discussed in further detail below with reference to FIGS. 3-7.

In one embodiment, the operator logic 320 and the asynchronous in-memory data checkpointing system 330 comprise software modules that are persistently stored in a storage device, and loaded into system memory resources (e.g., the volatile memory 312 and/or non-volatile memory 314), and executed by the processing units 302 to perform various functions as described herein. In this regard, the system memory 310 resources and other memory or storage media as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the invention. An article of manufacture may comprise, for example, a storage device such as a storage disk, a storage array or an integrated circuit containing memory. The term "article of manufacture" as used herein should be understood to exclude transitory, propagating signals.

The processing units 302 comprise one or more multicore processors that are configured to process program instructions and data to execute a native operating system (OS) and applications that run on the worker server node 300. In other embodiments, processing units 302 may comprise one or more of a computer processor, a microprocessor, a microcontroller, an application-specific integrated circuit (ASIC), a field programmable gate array (FPGA), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, GPUs (graphics processing units), digital signal processors (DSPs), system-on-chip (SoC), application-specific integrated circuits (ASICs), and field programmable gate array (FPGAs), and other types of specialized processors or coprocessors that are configured to execute one or more fixed functions. The term "hardware accelerator" broadly refers to any hardware that performs "hardware acceleration" to perform certain functions faster and more efficient than is possible for executing such functions in software running on a more general purpose processor.

The storage interface circuitry 304 enables the processing units 302 to interface and communicate with the system memory 310, the local file store 340, a remote data storage system (e.g., data storage system 240, FIG. 2), and other local storage and off-infrastructure storage media, using one or more standard communication and/or storage control protocols to read data from, or write data to, volatile and non-volatile memory/storage devices. The network interface circuitry 306 enables the worker server node 300 to interface and communicate with a network and other system components. The network interface circuitry 306 may comprise conventional transceivers of a type well known in the art (e.g., network interface cards, I/O adaptors, etc.).

The virtualization resources 308 can be instantiated to execute one or more applications, processes, software modules, and/or functions which are hosted by the worker server node 300. For example, the operator logic 320 and/or the asynchronous in-memory data checkpointing system 330 can be implemented using the virtualization resources 308.

In one embodiment, the virtualization resources 308 comprise virtual machines that are implemented using a hypervisor platform which executes on the worker server node 300, wherein one or more virtual machines can be instantiated to execute functions of the worker server node 300. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the worker server node 300, and emulates the CPUs, memory, hard disk, network and other hardware resources of a host system, enabling multiple virtual machines to share the resources. The hypervisor can emulate multiple virtual hardware platforms that are isolated from each other, allowing virtual machines to run, e.g., Linux and Windows Server operating systems on the same underlying physical host. An example of a commercially available hypervisor platform that may be used to implement one or more of the virtual machines in one or more embodiments of the invention is the VMware® vSphere™ which may have an associated virtual infrastructure management system such as the VMware® vCenter™. The underlying physical infrastructure may comprise one or more commercially available distributed processing platforms which are suitable for the target application.

In another embodiment, the virtualization resources 308 comprise containers such as Docker containers or other types of Linux containers (LXCs). As is known in the art, in a container-based application framework, each application container comprises a separate application and associated dependencies and other components to provide a complete file system, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the worker server node 300. In yet another embodiment, containers may be used in combination with other virtualization infrastructure such as virtual machines implemented using a hypervisor, wherein Docker containers or other types of LXCs are configured to run on virtual machines in a multi-tenant environment.

The system memory 310 comprises electronic storage media such as RAM, read-only memory (ROM), or other types of memory, in any combination. The term "memory" or "system memory" as used herein refers to volatile and/or non-volatile memory which is utilized to store application program instructions that are read and processed by the processing units 302 to execute a native operating system and one or more applications hosted by the worker server node 300, and to temporarily store data that is utilized and/or generated by the native OS and application programs running on the worker server node 300. For example, the volatile memory 312 of the system memory 310 may be a dynamic random-access memory or other forms of volatile RAM. The non-volatile memory 314 may comprise a storage-class memory (SCM) that is accessible as a memory resource. For example, the non-volatile memory 314 may be a NAND Flash storage device, a SSD storage device, or other types of next generation non-volatile memory (NG-NVM) devices.

The operator logic 320 of the given worker server node 300 is configured to execute a portion of the computational tasks on data tuples within the topology of operators (e.g., DAG of operators) configured by the application manager 214 to perform a streaming computation in the distributed computing system of FIG. 2. The operator logic 320 utilizes the asynchronous in-memory data checkpointing system 330 to checkpoint an in-memory state of the operator logic 320. The checkpoint handler 332 serves as an entry point for the operator logic 320 to commence a checkpoint operation for generating a snapshot (or checkpoint images) of an in-memory state of the operator logic 320. In one embodiment of the invention, a checkpoint operation is triggered (via a windows-based checkpoint scheme) by the presence of a checkpoint command embedded in the data tuple stream being processed by the operator logic 320. The checkpoint handler 332 implements a "save checkpoint" function and a "load checkpoint" function. The "save checkpoint" function serves to save a point-in-time snapshot of one or more selected in-memory states of the operator logic 320 into a checkpoint state queue (CkptStateQueue), and trigger the background worker threads 336 to store the checkpointed states in a persistent storage (e.g., local file store 340 and/or a remote storage). In one embodiment, a transient state of the operator could be temporarily ignored and not checkpointed until the operator state becomes non-transient. A transient operation state can be marked or flagged by the operator logic 320 to defer state checkpointing until the flag indicates that the operator state is no longer transient or that the operator state has changed.

The "load checkpoint" function of the checkpoint handler 332 implements a recovery routine, which is coordinated by the checkpoint manager 216, to load one or more checkpointed states from storage and resume processing from a previous checkpointed system state to thereby recover from a failure. A failure recovery method according to an embodiment of the invention will be discussed in further detail below with reference to FIG. 8.

The checkpoint state queue manager 334 implements functions to create and manage a checkpoint state queue (CkptStateQueue) in system memory 310, which is utilized to store checkpointed images (any point-in-time version) of the operator state. The operator state is serialized and saved in such in-memory checkpoint state queue for high performance. The checkpoint state queue serves to decouple normal processing workflow and checkpoint workflow and thus reduce the latency impact of checkpointing operations. In addition, checkpoint state queue maintains an order of checkpointed operator states, which is important for accurate failure recovery.

The background worker threads 336 perform various functions such as dequeuing checkpointed states from the checkpoint state queue, and storing the dequeued operator states into a pre-configured data store (e.g., local file store 340 or remote HDFS). The background worker threads 336 can batch process the checkpointed operator states that are dequeued from the checkpoint state queue, and then compress the checkpointed operator states prior to saving the checkpointed operator states in the pre-configured data store. The background worker threads 336 perform other functions, as will be discussed in further detail below.

The checkpoint acknowledgment queue manager 338 implements functions to create and manage a checkpoint acknowledgment queue (CkptAckQueue) in system memory 310, which is utilized to maintain information regarding completion of the asynchronous checkpoint operations in which checkpoints of the operator states are background stored in the pre-configured data store. The information contained in the checkpoint acknowledgment queue can be batch processed by the background worker threads 336 and sent to the checkpoint manager 216 (FIG. 2) to update the global checkpoint metadata maintained by the checkpoint manager 216 with regard to the completion of checkpoint operations for the checkpoints of operator states.

Figure 4:
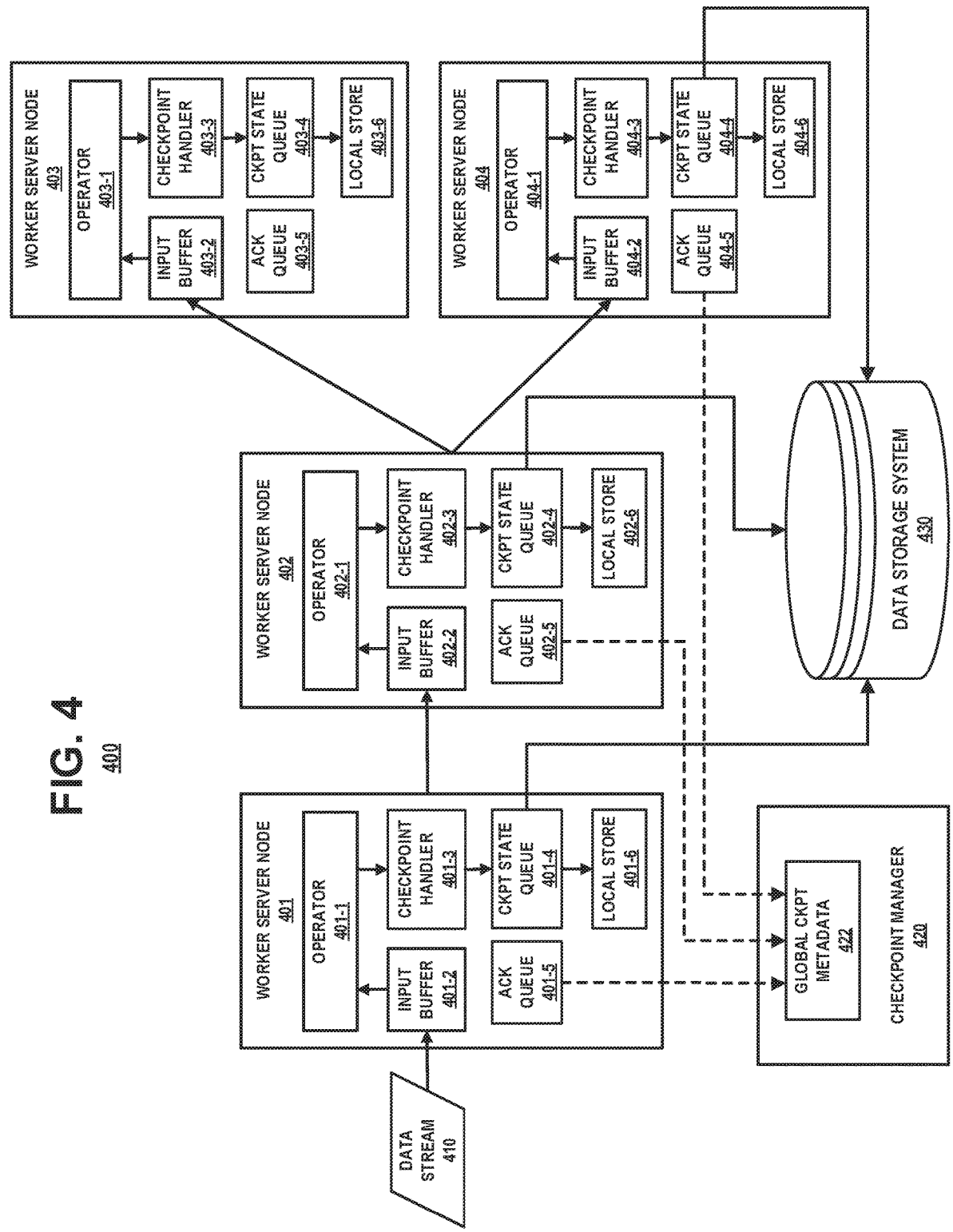
FIG. 4 schematically illustrates a run-time implementation of the distributed computing system of FIG. 2 according to an embodiment of the invention.

FIG. 4 schematically illustrates a run-time implementation of the distributed computing system of FIG. 2 according to an embodiment of the invention. In particular, FIG. 4 schematically illustrates a distributed computing system 400 which comprises a plurality of worker server nodes 401, 402, 403, and 404 that implement an asynchronous in-memory data checkpointing system based on the system framework illustrated in FIG. 3. As shown in FIG. 4, the worker server nodes 401, 402, 403, and 404 comprise respective operators 401-1, 402-1, 403-1, and 404-1, respective input buffers 401-2, 402-2, 403-2, and 404-2, respective checkpoint handlers 401-3, 402-3, 403-3, and 404-3, respective checkpoint state queues 401-4, 402-4, 403-4, and 404-4, respective checkpoint acknowledgment queues 401-5, 402-5, 403-5, and 404-5, and respective local file stores 401-6, 402-6, 403-6, and 404-6. The distributed computing system 400 of FIG. 4 further comprises a checkpoint manager 420 which manages a global checkpoint metadata structure 422, which is maintained in a high-availability (HA) system for continuous access.

In the illustrative system 400 of FIG. 4, the worker server nodes 401, 402, 403, and 404 are configured in a topology in which the worker server node 401 receives an incoming data stream 410 into the input buffer 401-2, wherein the input data stream is processed by the operator 401-1 to generate processing results that are stored in an output buffer of the worker server node 401 (e.g., output buffer 233, FIG. 2). In addition, the worker server node 402 receives the computation results (which are generated by the operator 401-1) into the input buffer 402-2, and the computation results are further processed by the operator 402-1 to generate processing results which are stored in an output buffer of the worker server node 402. Further, the worker server nodes 403 and 404 receive the computation results, or portions thereof (which are generated by the operator 402-1), into the respective input buffers 403-2 and 404-2, and the computation results are further processed by the operators 403-1 and 404-1 to generate final or intermediate processing results (depending on whether additional downstream processing is performed to the outputs of the worker server nodes 403 and 404).

In the run-time distributed computing system 400 of FIG. 4, each operator 401-1, 402-1, 404-3, and 404-1 initiates checkpointing operations independently of checkpointing operations that are initiated by the other operators. In one embodiment of the invention, only those operators with non-transient states would checkpoint their in-memory states to storage e.g., local file store 401-6, 402-6, 403-6, 404-6 and/or a data storage system 430 (e.g., HDFS). In the example embodiment of FIG. 4, it is assumed that at a given point in time, the operator 403-1 executing on the worker server node 403 has only a transient state and, therefore, does not perform checkpoint operation, while the operators 401-1, 402-1 and 404-1 have non-transient states that are being checkpointed to the data storage system 430, for example.

The checkpointing operations performed in the worker server nodes 401, 402 and 404 are illustrated by the solid arrows from the checkpoint state queues 401-4, 402-4, and 404-4 to the data storage system 430 (which indicates that checkpointed operator states are being stored in the data storage system 430), and by the dashed arrows from the checkpoint acknowledgement queues 401-5, 402-5, and 404-5 to the global checkpoint metadata structure 422 maintained by the checkpoint manager 420. In one embodiment of the invention, the global checkpoint metadata structure 422 maintained by the checkpoint manager 420 comprises various types of information as illustrated in the following table:

| METADATA | DESCRIPTION |
|---|---|
| Topol_ID | Denotes a topology identifier. Each topology of operators can process one or multiple input data streams |
| Stream_ID | Denotes an input stream identifier. |
| Window_ID | Denotes an identifier of a given window (block of data records) of an input data stream (e.g., windows based checkpointing) |
| Ckpt_ID | Denotes a unique identifier of a generated checkpoint |
| Op_ID | Denotes an identifier of the associated operator (a bitmap can be used to mark operators in the topology) |
| State | Indicates a Ckpt state (e.g. initial, in-progress, complete) |

In the illustrative distributed computing system 400 of FIG. 4, the global checkpoint metadata structure 422 is utilized by the checkpoint manager 420 to track the distributed checkpoint state over the cluster of worker server nodes 401, 402, 403, and 404. As noted above, the checkpoint manager 420 is aware of cluster and operator topology through communication with resource and application managers (e.g., managers 212 and 214, FIG. 2), wherein information that is relevant to the cluster and operator topology is maintained in the global checkpoint metadata structure 422. As shown in FIG. 4, when a checkpointing operation (e.g., checkpoint state save operation) is completed for a given operator executing on a given worker node, the completed checkpoint operation (for a given Ckpt_ID, for a given window of data records with Window_ID, for a given data stream with Stream_ID) is reported to the checkpoint manager 420. When the checkpoint operations for the operator states of all operators in the given topology are completed for the given data stream window of Window_ID of the given data steam with Stream_ID, the checkpoint manager 420 will update the global checkpoint metadata structure 422 to indicate that the checkpointing operation for the given window of Window_ID of the given data stream with Stream_ID is completed.

Figure 5:
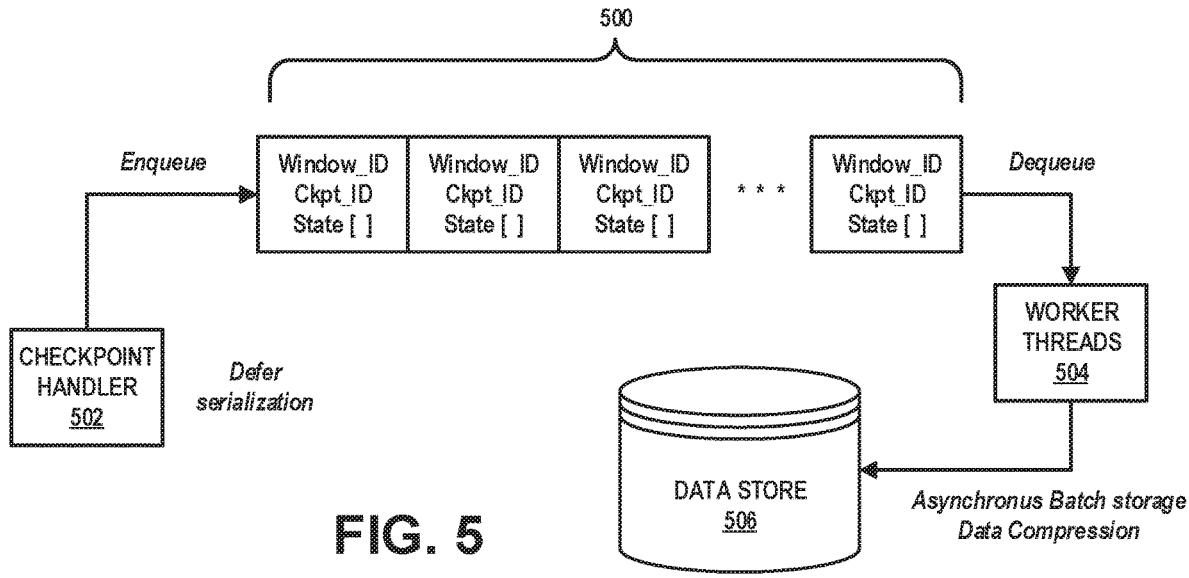
FIG. 5 schematically illustrates a method for managing a checkpoint state queue to support asynchronous in-memory data checkpoint operations, according to an embodiment of the invention.

The checkpoint operations shown in FIG. 4 will be discussed now in further detail with reference to FIGS. 5, 6, and 7. For example, FIG. 5 schematically illustrates a method for managing a checkpoint state queue 500 to support asynchronous in-memory data checkpoint operations, according to an embodiment of the invention. As shown in FIG. 5, in response to a checkpoint command issued from a given operator, a checkpoint handler 502 performs a "save checkpoint" operation (or saveCkpt operation) which comprises serializing an in-memory operator state and storing a checkpoint of the serialized operator state into the in-memory checkpoint state queue 500. In one embodiment of the invention, the checkpoint state queue 500 is implemented in-memory as a first-in-first-out (FIFO) data structure, wherein a first checkpoint element added to the queue will be the first element to be removed, thereby imparting an order to the checkpoint elements maintained in the checkpoint state queue 500. As shown in FIG. 5, each checkpoint element in the checkpoint state queue 500 comprises metadata such as Window_ID, Ckpt_ID and the serialized checkpoint State. As noted above, the checkpoint state queue 500 serves to decouple the checkpointing process flow from the normal processing flow performed by the operators, allowing the operators to continue with normal processing of data stream records.

As further shown in FIG. 5, one or more worker threads 504 are triggered by the checkpoint handler 502 to dequeue one or more serialized checkpointed operator states from the checkpoint state queue 500 and store the checkpointed states in a data store 506. The storage operations are performed by the worker threads 504 in the background, wherein the worker threads 504 can perform functions such as batch processing (e.g., aggregating) the dequeued checkpoint states and data compressing the aggregated data prior to storage in the data store 506.

The order of the checkpoint states is important for accurate fault recovery. The FIFO implementation of the checkpoint state queue 500 shown in FIG. 5 is one implementation which can be used to preserve the order of checkpointed operator states as needed. However, the use of a FIFO checkpoint state queue 500 to achieve a strict order may add overhead and higher memory occupation due to the potential bottleneck or slow dequeuing operations implemented by the background worker threads 504 when storing the checkpointed operator states to the data store 506.

In another embodiment, multiple checkpoint state queues (similar to the queue 500 shown in FIG. 5) and multiple dequeue worker threads can be implemented in parallel to persistently store checkpointed operator states to the data store 506. In this way, the ordering of the checkpointed operators is not necessarily enforced during the dequeuing operations, but enforced during checkpoint acknowledge operations and fault recovery. For example, multiple state versions could be persisted then acknowledged in parallel, wherein the acknowledge ("ACK") records include (Window_ID) and other metadata to ensure that fault recovery is started from the last successful slowest Window_ID checkpoint. This technique reduces the memory footprint of the checkpoint state queue and mitigates any backpressure that may exist in the background storage operations or storing the checkpointed operator states to the data store 506. Further optimizations include, for example, deferring a checkpoint process of a given operator state until there is change in the operator state (by setting a flag). Moreover, as indicated above, the checkpointed states which are dequeued from the checkpoint state queue can be batched and compressed during the background persistent storage operations. In addition, serialization of the checkpoints of the operator states in the in-memory queue 500 can be aligned with a HDFS client interface to avoid the need for additional serialization (temp file), thereby allowing checkpointed states to be transformed from in-memory object to HDFS directly.

Figure 6:
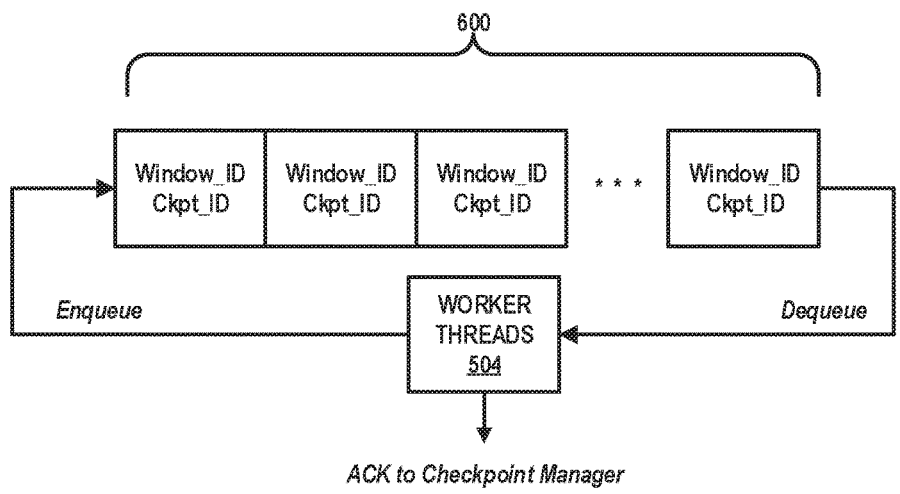
FIG. 6 schematically illustrates a method for managing a checkpoint acknowledgment queue to support asynchronous in-memory data checkpoint operations, according to an embodiment of the invention.

FIG. 6 schematically illustrates a method for managing a checkpoint acknowledgment queue 600 to support asynchronous in-memory data checkpoint operations, according to an embodiment of the invention. In one embodiment of the invention, the checkpoint acknowledgment queue 600 is implemented in-memory as lightweight queue-like data structure that maintains ACK records which indicate completed checkpointing events (e.g., checkpointed operator states stored in persistent storage such as local file store or remote data store). As shown in FIG. 6, each ACK record in the checkpoint acknowledgment queue 600 comprises metadata such as Window_ID and Ckpt_ID. The ACK records in the checkpoint acknowledgment queue 600 are enqueued by the background worker threads 504 when persistent storage of checkpointed operator states to the data store 506 are completed, and then dequeued by the background worker threads 504, possibly aggregated (e.g., batched processed), and then sent to the checkpoint manager 420 (FIG. 4) to update the global checkpoint metadata structure 422 using information contained in the ACK records.

Figure 7:
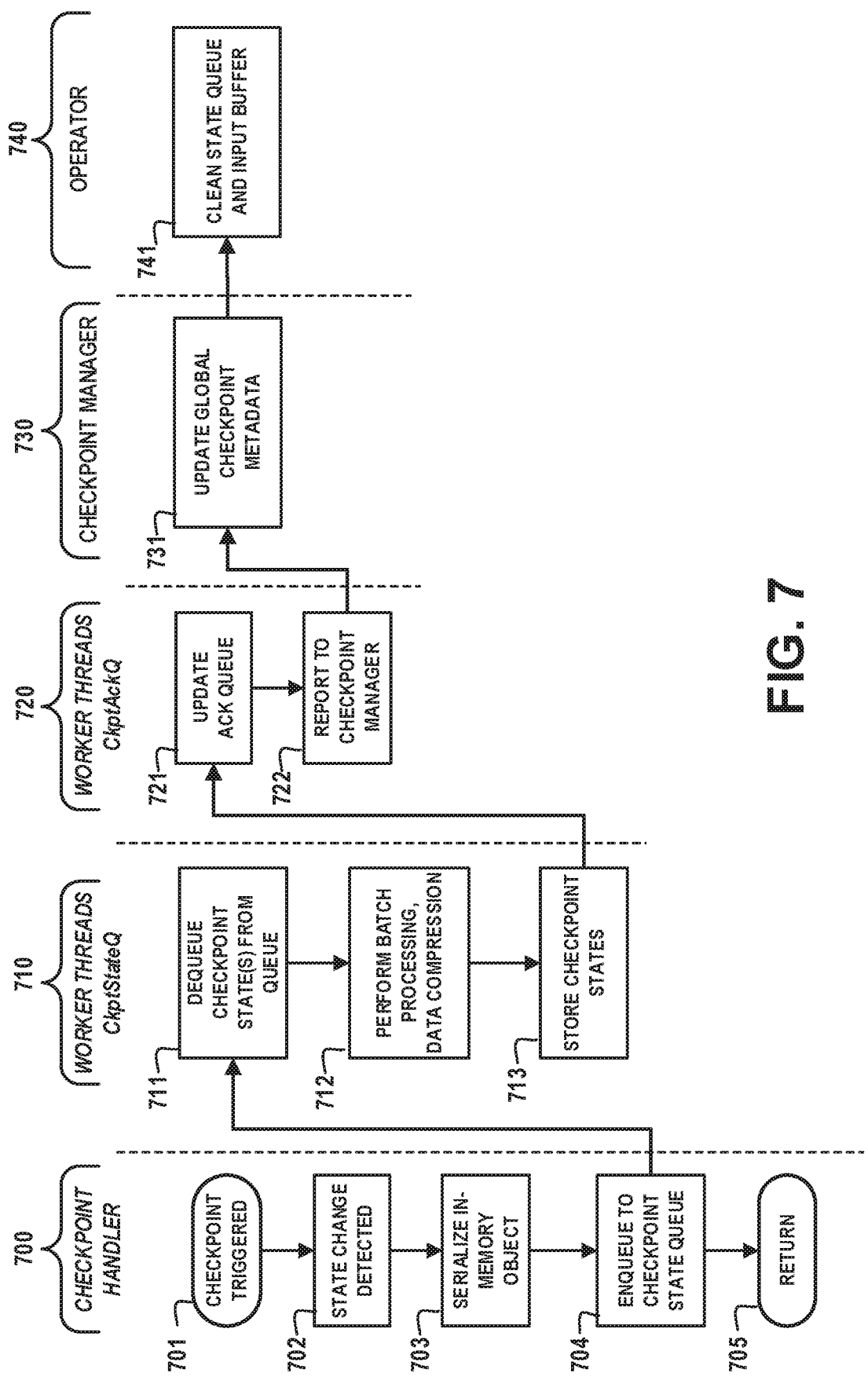
FIG. 7 illustrates an asynchronous in-memory data checkpoint method according to an embodiment of the invention.

FIG. 7 illustrates an asynchronous in-memory data checkpoint method according to an embodiment of the invention. In particular, FIG. 7 illustrates an example embodiment of an asynchronous in-memory data checkpoint method in which a plurality of pipeline operations 700, 710, 720, 730, and 740 to support asynchronous checkpoint operations are performed in parallel. For example, the pipeline operation 700 illustrates a method performed by a checkpoint handler operating on a given worker node. The pipeline operation 710 illustrates a method implemented by background worker threads for persistently storing in-memory checkpoints of operator states to a persistent storage system. The pipeline operation 720 illustrates a method implemented by background worker threads for processing ACK records stored in a checkpoint acknowledgment queue. The pipeline operation 730 illustrates a method performed by the checkpoint manager to manage the global checkpoint metadata structure, and the pipeline operation 740 illustrates method performed by an operator to update an associated state queue and input buffer following the completion of a checkpoint operation which is committed by the checkpoint manager.

In particular, the pipeline operation 700 performed by the checkpoint handler comprises receiving a command from an operator which triggers a checkpoint save operation (block 701). As noted above, a checkpoint can be triggered in response to a checkpoint command embedded in a data stream, or in response to an event that occurs with regard to a configurable checkpoint window (e.g., every X number or data records, or the expiration of period of time, etc.) The checkpoint handler will determine if there is any change in an in-memory state of the operator since a last checkpoint operation (block 702). If a given in-memory operator state exists which should be checkpointed, the checkpoint handler will serialize the in-memory state object (block 703) and then store a checkpoint of the serialized operator state along with associated metadata (e.g., Window_ID, Ckpt_ID) to a checkpoint state queue (block 704). The checkpoint handler process returns (block 705) to wait for another checkpoint command.

The pipeline operation 710 performed by the worker threads comprises dequeuing one or more checkpoints of operator states from the checkpoint state queue (block 711), aggregating and compressing the dequeued checkpoints of operator states (block 712), and then persistently storing the checkpoints of operator states to a reliable pre-configured data store (block 713). The pipeline operation 720 performed by the worker threads comprises updating the checkpoint acknowledgment queue with an ACK record (block 721) when a checkpoint operation is complete, and then dequeuing one or more ACK records from the checkpoint acknowledgment queue, batch processing the dequeued ACK records, and reporting the dequeued ACK records to the checkpoint manager (block 722). The pipeline operation

730 performed by the checkpoint manager comprises updating the global checkpoint metadata structure (block 731) using information contained in the received ACK records. For example, the checkpoint manager will update the global checkpoint metadata structure with information regarding the completion of the state checkpoint operation performed for a given operator (Op_ID) for a given Ckpt_ID, for a given Window_ID and for a given Stream_ID. With regard to the pipeline operation 740 performed by an operator, once all operators complete a checkpoint operation of their states with regard to a specific window having the same Window_ID for the given Stream_ID, the checkpoint manager will notify the operators to purge or otherwise cleanup the pending states in the checkpoint state queues and stream data in the input data buffers. Once such notification is received by a given operator, the operator will proceed to clean/purge the checkpointed operator state and data records from the respective checkpoint state queue and input data buffer (block 741).

Figure 8:
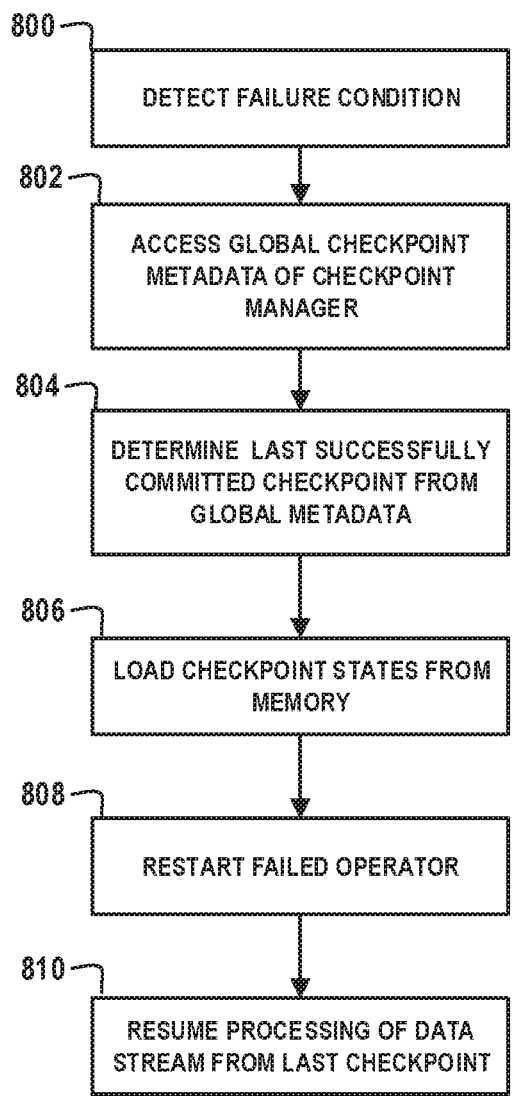
FIG. 8 illustrates a failure recovery method which is implemented for an asynchronous in-memory data checkpoint system according to an embodiment of the invention.

FIG. 8 illustrates a failure recovery method which is implemented for an asynchronous in-memory data checkpoint system according to an embodiment of the invention. The failure recovery method of FIG. 8 is based on underlying principles that the checkpoint manager serves as a final bookkeeper of information that is used to support recovery operations and that streaming data for a given Window_ID is retained by the operators until the checkpoint for the given Window_ID is committed by the checkpoint manager. Referring to FIG. 8, a recovery method is triggered when a failure condition is detected one a given node (block 800). A failure condition can be, for example, a software error, a memory failure, a power failure, or a timeout condition. In response to detecting the failure condition, the checkpoint handler operating on the given node would execute a load checkpoint operation to perform a recovery routine. The checkpoint handler would communicate with the checkpoint manager 420 (FIG. 4) and access information within the global checkpoint metadata structure 422 (e.g., via storing through the Window_ID and State metadata) (block 802) to determine the last successfully committed checkpoint operation (block 804). The checkpoint states associated with the last successfully committed checkpoint operation would then be accessed from persistent storage, and then loaded into system memory (block 806). The failed operator would be restarted (block 808) and the data stream processing would be resumed starting from the last checkpoint (block 810).

As illustrated above, asynchronous checkpointing systems and methods according to embodiments of the invention utilize in-memory queues (e.g., checkpoint state queue, checkpoint acknowledgment queue) as well as background worker threads to decouple the normal real-time processing functions executed by operators from the checkpoint I/O operations needed for persistent storage of checkpointed operators states, thereby hiding I/O latency and significantly reducing the performance impact of real-time processing in a distributed computing system due to checkpointing operations. Indeed, with asynchronous checkpointing techniques discussed herein, various data structures (e.g., checkpoint state queue) are maintained in-memory, wherein selected states can be serialized directly into a data storage system (e.g., HDFS) to avoid unnecessary read and deserialization operations, thereby saving CPU and resource usage. Further, serialization and checkpointing of operator states can be deferred until a state change is detected, and batch processing and data compression of multiple checkpointed operator states can be performed by background worker threads to improve overall system efficiency. The asynchronous checkpoint techniques discussed herein are configured to hide disk/networking I/O latency and implemented mechanisms for guaranteed processing order. Moreover, as illustrated in FIG. 7, the various modules for supporting asynchronous checkpointing operations are run in a pipelined and parallel manner, thereby enhancing system performance with regard to checkpointing operations.

It is to be understood that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:
processing a stream of data records by an operator executing on a computing node;
maintaining in a system memory of the computing node, an operator state which is generated in response to the operator processing the stream of data records; and
performing an asynchronous checkpointing process by a checkpointing system executing on the computing node, wherein the asynchronous checkpointing process comprises:
enqueuing a checkpoint of the operator state in a first queue, wherein the first queue is maintained in the system memory of the computing node;
executing a background worker thread on the computing node to dequeue the checkpoint of the operator state from the first queue and store the checkpoint of the operator state in a data store;
sending metadata to a central checkpoint manager, wherein the metadata comprises information which is configured to enable the central checkpoint manager to track a status of the asynchronous checkpointing process;
wherein the asynchronous checkpointing process is performed independent of asynchronous checkpointing operations performed by one or more other operators processing the stream of data records; and
wherein the operator continues with processing the stream of data records during the asynchronous checkpointing process.

2. The method of claim 1, wherein enqueuing the checkpoint of the operator state in the first queue comprises:
serializing the operator state, and
storing a checkpoint of the serialized operator state in the first queue.

3. The method of claim 1, wherein the asynchronous checkpointing process further comprises:
dequeuing, by the background worker thread, a plurality of checkpoints of operator states of different operators, which are stored in the first queue;
batch processing the plurality of checkpoints dequeued from the first queue to store the plurality of checkpoints in the data store.

4. The method of claim 3, wherein the asynchronous checkpointing process further comprises compressing the plurality of checkpoints of the operator states, by the background worker thread, and storing compressed checkpoints of the operator states in the data store.

5. The method of claim 1, wherein the first queue in the system memory comprises a first-in-first-out (FIFO) queue structure.

6. The method of claim 1, wherein enqueuing the checkpoint of the operator state in the first queue comprises embedding metadata with the checkpoint of the operator state, wherein the metadata comprises a unique checkpoint identifier of the checkpoint, and a window identifier which identifies a block of data records within the stream of data records which corresponds to the checkpoint.

7. The method of claim 1, wherein the asynchronous checkpointing process further comprises enqueuing, by the background worker thread, a checkpoint acknowledgement record in a second queue which resides in the system memory, after the checkpoint of the operator state is stored in the data store, wherein the checkpoint acknowledgement record indicates that the storage of the checkpoint of the operator state in the data store is completed.

8. The method of claim 7, wherein the asynchronous checkpointing process further comprises:
dequeuing, by the background worker thread, the checkpoint acknowledgement record from the second queue; and
sending the acknowledgment record to the central checkpoint manager.

9. The method of claim 8, wherein the metadata that is sent to the central checkpoint manager comprises metadata contained in the checkpoint acknowledgement record, wherein the metadata comprises a unique checkpoint identifier of the checkpoint, and a window identifier which identifies a block of data records within the stream of data records which corresponds to the checkpoint;
wherein the central checkpoint manager maintains global checkpoint metadata associated with a topology of operators that are configured to process the stream of data records;
wherein the global metadata is utilized to track a completion of a checkpoint operation by all operators within the topology of operators with respect to checkpoints of the operator states of all the operators which have a same window identifier.

10. An article of manufacture comprising a processor-readable storage medium having stored program code which is executable by a processor to implement a method which comprises:
processing a stream of data records by an operator executing on a computing node;
maintaining in a system memory of the computing node, an operator state which is generated in response to the operator processing the stream of data records; and
performing an asynchronous checkpointing process by a checkpointing system executing on the computing node, wherein the asynchronous checkpointing process comprises:
enqueuing a checkpoint of the operator state in a first queue, wherein the first queue is maintained in the system memory of the computing node;
executing a background worker thread on the computing node to dequeue the checkpoint of the operator state from the first queue and store the checkpoint of the operator state in a data store;
sending metadata to a central checkpoint manager, wherein the metadata comprises information which is configured to enable the central checkpoint manager to track a status of the asynchronous checkpointing process;
wherein the asynchronous checkpointing process is performed independent of asynchronous checkpointing operations performed by one or more other operators processing the stream of data records; and
wherein the operator continues with processing the stream of data records during the asynchronous checkpointing process.

11. The article of manufacture of claim 10, wherein enqueuing the checkpoint of the operator state in the first queue comprises:
serializing the operator state, and
storing a checkpoint of the serialized operator state in the first queue.

12. The article of manufacture of claim 10, wherein the program code that is executable by the processor to perform the asynchronous checkpointing process further comprises program code that is executable by the processor to perform a method which comprises:
dequeuing, by the background worker thread, a plurality of checkpoints of operator states of different operators, which are stored in the first queue;
batch processing the plurality of checkpoints dequeued from the first queue to store the plurality of checkpoints in the data store.

13. The article of manufacture of claim 12, wherein the program code that is executable by the processor to perform the asynchronous checkpointing process further comprises program code that is executable by the processor to perform a method which comprises compressing the plurality of checkpoints of the operator states, by the background worker thread, and storing compressed checkpoints of the operator states in the data store.

14. The article of manufacture of claim 10, wherein the first queue in the system memory comprises a first-in-first-out (FIFO) queue structure.

15. The article of manufacture of claim 10, wherein enqueuing the checkpoint of the operator state in the first queue comprises embedding metadata with the checkpoint of the operator state, wherein the metadata comprises a unique checkpoint identifier of the checkpoint, and a window identifier which identifies a block of data records within the stream of data records which corresponds to the checkpoint.

16. The article of manufacture of claim 10, wherein the program code that is executable by the processor to perform the asynchronous checkpointing process further comprises program code that is executable by the processor to perform a method which comprises enqueuing, by the background worker thread, a checkpoint acknowledgement record in a second queue which resides in the system memory, after the checkpoint of the operator state is stored in the data store, wherein the checkpoint acknowledgement record indicates that the storage of the checkpoint of the operator state in the data store is completed.

17. The article of manufacture of claim 16, wherein the program code that is executable by the processor to perform the asynchronous checkpointing process further comprises program code that is executable by the processor to perform a method which further comprises:
dequeuing, by the background worker thread, the checkpoint acknowledgement record from the second queue; and sending the acknowledgment record to the central checkpoint manager.

18. The article of manufacture of claim 17, wherein the metadata that is sent to the central checkpoint manager comprises metadata contained in the checkpoint acknowledgement record, wherein the metadata comprises a unique checkpoint identifier of the checkpoint, and a window identifier which identifies a block of data records within the stream of data records which corresponds to the checkpoint;
  wherein the central checkpoint manager maintains global checkpoint metadata associated with a topology of operators that are configured to process the stream of data records;
  wherein the global metadata is utilized to track a completion of a checkpoint operation by all operators within the topology of operators with respect to checkpoints of the operator states of all the operators which have a same window identifier.

19. A computing node comprising:
  a system memory configured to store program instructions; and
  at least one processor configured to execute the stored program instructions in the system memory to perform a method comprising:
  processing a stream of data records by an operator executing on a computing node;
  maintaining in a system memory of the computing node, an operator state which is generated in response to the operator processing the stream of data records; and
  performing an asynchronous checkpointing process by a checkpointing system executing on the computing node, wherein the asynchronous checkpointing process comprises:
    enqueuing a checkpoint of the operator state in a first queue, wherein the first queue is maintained in the system memory of the computing node;
    executing a background worker thread on the computing node to dequeue the checkpoint of the operator state from the first queue and store the checkpoint of the operator state in a data store;
    sending metadata to a central checkpoint manager, wherein the metadata comprises information which is configured to enable the central checkpoint manager to track a status of the asynchronous checkpointing process;
  wherein the asynchronous checkpointing process is performed independent of asynchronous checkpointing operations performed by one or more other operators processing the stream of data records; and
  wherein the operator continues with processing the stream of data records during the asynchronous checkpointing process.

20. The computing node of claim 19, wherein the asynchronous checkpointing process further comprises:
  enqueuing, by the background worker thread, a checkpoint acknowledgement record in a second queue which resides in the system memory, after the checkpoint of the operator state is stored in the data store, wherein the checkpoint acknowledgement record indicates that the storage of the checkpoint of the operator state in the data store is completed;
  dequeuing, by the background worker thread, the checkpoint acknowledgement record from the second queue; and
  sending the acknowledgment record to a central checkpoint manager.

* * * * *